Patented Mar. 10, 1936

2,033,698

UNITED STATES PATENT OFFICE 2,033,698

ABSORBENT MATERIAL AND PROCESS OF MAKING THE SAME

John Finn, Jr., Berkeley, Calif., assignor to E. D. Bullard Company, San Francisco, Calif., a corporation of California No Drawing. Application June 5, 1933, Serial No. 674,411

14 Claims. (Cl. 252—2.5)

My invention relates to the purifying of air for breathing; and particularly to an improved absorbent material for removing harmful impurities from air, and the method of preparing the same.

One object of my invention is to provide an improved absorbent material for use in gas masks and devices of similar nature for removing harmful impurities from air.

Another object is to provide an improved method of activating fibrous vegetable substance to supplement its property of reacting with harmful impurities in air passed through the absorbent material for breathing purposes.

It is also an object of my invention to provide an absorbent substance having material advantages both in economy and effectiveness.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

In terms of broad inclusion, the absorbent material of my invention comprises a fibrous vegetable substance preferably redwood bark, having the natural property of reacting to a greater or lesser extent with various harmful impurities commonly encountered in air which should be purified for breathing. The natural property of redwood bark to react with various impurities may be materially increased, and in some cases supplied, by treating the redwood bark with a suitable activating agent having the property of reacting directly or by its reaction products with the particular impurities to be removed. My invention therefore also contemplates an activated redwood bark and the process of activating the same. The redwood bark is used in its natural uncharred state as distinguished from charcoal and similar charred materials heretofore used for the absorption of gases and impurities.

In terms of greater detail, the chemical composition of redwood bark is such that in its natural state it is capable of reacting with and absorbing most of the known poisonous gases and impurities in air to be purified for breathing. While the precise chemical composition of redwood bark is not fully known, and the character and extent of the action that takes place varies with different impurities, it is believed that various components of the bark, such as haematein, haematoxylin, and various plant acids and complex organic compounds, react with poisonous gases and impurities either by annexing atoms or molecules of the impurity or by substitution of atoms or molecules of the impurity for hydrogen atoms of the organic compound.

The bark is processed in any suitable manner, as by shredding, to produce a mass of relatively fine matted fibers which may be conveniently packed in a gas mask canister or similar device. Used alone, redwood bark so processed is a cheap and effective absorbent for many harmful impurities such as ammonia, sulphur dioxide, carbon monoxide, and, to varying degree, most of the harmful impurities commonly encountered. This quality may by the practice of my invention, be greatly increased and extended.

In order to increase the natural property of redwood bark to react with various impurities, the processing may include treating the bark with a suitable activating agent selected in accordance with the particular impurities to be removed. For poisonous gases and impurities of an alkaline or base nature, an acid activating agent is employed. For example, to activate the bark for the absorption of substantial quantities of ammonia, I treat the bark with an acid activating agent, preferably sulphuric acid. The term activating agent is applied to any substance added to the redwood bark either for increasing the effectiveness of the natural properties of the bark, or for supplementing the natural properties of the bark by the reactive properties of the added substance itself.

A satisfactory method of treating the bark with the acid comprises mixing one-half pound of redwood bark with 50 cc. of sulphuric acid and 50 cc. of water. This mixture will absorb up to 2% of ammonium gas from air passed therethrough at the rate of 32 liters per minute for a period of 33 minutes. In so activating the bark, one or more of the organic compounds, as for example haematein, $C_{16}H_{12}O_6$ annexes the $SO_3$ radical of the acid to produce $C_{16}H_{11}(SO_3H)O_6$. This in turn reacts with ammonia to produce $C_{16}H_{11}(SO_3NH_4)O_6$. Any lesser amount of the acid activating agent may be used, or if desired, the amount of acid may be increased to as much as 60 cc. per one-half pound of redwood bark depending upon the nature and concentration of the impurities to be removed.

In addition to the treatment with an acid activating agent, the bark may be treated with a solution of a suitable salt, preferably a salt of the acid activating agent. For example, in activating the bark with sulphuric acid, ammonium sulfate may be added. Sodium sulfate or other equivalent salt may be substituted for the ammonium sulfate if desired. The salt tends to dry the acid. At the same time, the acid tends to react with the salt to produce an acid salt possessing desirable physical and reactive properties not possessed by either the acid or the normal salt. For example, in the treatment with sulphuric acid $H_2SO_4$ and normal sodium sulphate $Na_2SO_4$ the acid salt $NaHSO_4$ is produced. The acid salt does not corrode the ordinary gas mask canister, and aids in the reaction with and absorption of impurities in the air. If desired, the acid salt may be added directly.

A highly satisfactory result may be obtained by treating one-half pound of redwood bark with a solution comprising 200 cc. of water, 50 gr. sulphuric acid, and 50 gr. ammonium sulfate. The saturated bark is heated in an oven at approximately 250° F. until most of the water is driven off. The amount of the salt may be varied within wide limits, but should not exceed 170 grams in the example above given.

For activating the redwood bark to react with gases and impurities of an acid nature, such as hydrogen sulfide ($H_2S$), chlorine (Cl), chloro pictrin ($CCl_3NO_2$), sulfur dioxide ($SO_2$), and similar impurities, I use a base activating agent. For this purpose, I prefer to use triethanolamine $[(CH_2(OH)CH_2)_3N]$, caustic soda (NaOH), or sodium metaborate ($NaBO_2$ or $Na_2B_2O_4.4H_2O$). Any basic amine of a non-toxic nature such as mono-ethanolamine ($CH_2(OH)CH_2)NH_2$, or di-ethanolamine ($CH_2(OH)CH_2)_2NH$ may be substituted for the triethanolamine, and any caustic alkali or equivalent material may be substituted for the caustic soda. Any sodium or potassium borate or the equivalent may be used in place of the sodium meta-borate. Hydrated lime may also be used. The redwood bark is preferably soaked in the base activating agent in the case of triethanolamine, or in a water solution of the activating agent in the case of caustic alkali, sodium meta-borate, and the like. Other active agents such as the acid sulfate or ammonium, sodium, potassium, and the like may be used in a similar manner on in conjunction with the base activating agent. Where the bark is soaked in a water solution, the soaked material is heated to drive off excess moisture. The above described treatment not only materially increases the activity of the redwood bark as to those poisonous gases and impurities with which it reacts naturally, but may extend the activity to other impurities with which the bark in its natural state does not react to an appreciable extent.

The redwood bark may be further activated and its natural properties materially increased by treatment of the bark with vegetable haematein, haematoxylin and other similar substances such as occur to a more or less limited extent in the natural bark. For this purpose an extract of logwood, tan bark or other similar vegetable dye may be used. In order to insure that the dyes will react as they do in the natural redwood bark, I prefer to add a suitable reducing agent to supplement the natural reducing agents such as plant acids contained in the bark. For this purpose I prefer to use stannous chloride, but any reducing agent having no destructive action on the dye may be substituted.

The action occurs best when the bark and activating agents are in a slightly moist condition, and for this purpose I prefer to add gylcerine in an amount sufficient to moisten the bark. Hygroscopic salts such as iron chloride or other hygroscopic salt which does not harm the dye may be used if desired.

In place of redwood bark, other shredded vegetable substance of similar nature and properties may be used. Bagasse (sugar cane fiber) may be used. Tan bark, uncharred wood fiber, and various other related substances capable of reacting, or of being activated in accordance with my invention to react, with poisonous gases and impurities may also be used. In the case of the less active or inert vegetable substances, the action depends largely upon surface fixation of the impurities by the activating agents, and the effectiveness varies with the capacity of the vegetable substance to absorb the activating agents and reaction products thereof.

The processed redwood bark, with or without an activating agent or agents, is packed in a gas mask canister or other similar device in a compact mass sufficiently loose to permit air to pass therethrough, and sufficiently dense to insure intimate contact of the air with the fibrous material. Where air contains impurities of different reactive properties, a plurality of charges of fibrous material activated to react and absorb different types of impurities may be superimposed in the same canister.

I claim:

1. A filler for gas masks comprising shredded redwood bark impregnated with an agent capable of reacting in the present of the bark with impurities in air drawn through the filler for purifying the air.

2. A filler for gas masks comprising shredded redwood bark impregnated with an acid capable of reacting in the presence of the bark with impurities in air drawn through the filler for purifying the air.

3. A filler for gas masks comprising shredded redwood bark impregnated with an acid and an acid salt capable of reacting in the presence of the bark with impurities in air drawn through the filler for purifying the air.

4. A filler for gas masks comprising shredded redwood bark impregnated with an acid salt capable of reacting in the presence of the bark with impurities in air drawn through the filler for purifying the air.

5. A filler for gas masks comprising comminuted redwood bark impregnated with a base capable of reacting in the presence of the bark with impurities in air drawn through the filler for purifying the air.

6. A filler for gas masks comprising comminuted redwood bark impregnated with vegetable dye and a reducing agent capable of reacting in the presence of the bark with impurities in air drawn through the filler for purifying the air.

7. A filler for gas masks comprising a body of comminuted bark impregnated with an acid salt capable of reacting in the presence of the comminuted bark with impurities in air drawn through the filler for purifying the air.

8. A filler for gas masks comprising a body of comminuted bark impregnated with an acid and a salt of the acid capable of reacting in the presence of the comminuted bark with impurities in air drawn through the filler for purifying the air.

9. A filler for gas masks comprising a body of comminuted bark impregnated with an acid and an acid salt capable of reacting in the presence of the bark and of each other with impurities in air drawn through the filler for purifying the air.

10. The method of activating bark for purifying air which comprises separating the bark into small particles, soaking the particles in a fluid containing a reagent capable of reacting in the presence of the bark with impurities in air, and drying the particles to remove excess moisture and reagent.

11. The method of activating bark for purifying air which comprises separating the bark into small particles, soaking the particles in a solution of an acid and a salt capable of reacting in the presence of the bark with impurities in air, and drying the particles to remove excess moisture.

12. The method of activating bark for purifying air which comprises separating the bark into small particles, soaking the particles in a solution of an acid salt capable of reacting in the presence of the bark with impurities in air, and drying the particles to remove excess moisture.

13. The method of activating bark for purifying air which comprises separating the bark into small particles, soaking the particles in an alkaline reagent capable of reacting in the presence of the bark with impurities in air, and drying the particles to remove excess moisture and reagent.

14. The method of activating bark for purifying air which comprises separating the bark into small particles, soaking the particles in a vegetable dye and a reducing agent capable of reacting in the presence of each other and in the presence of the bark with impurities in air.

JOHN FINN, Jr.